(12) United States Patent
Raak et al.

(10) Patent No.: US 6,902,344 B2
(45) Date of Patent: Jun. 7, 2005

(54) ANGLE JOINT

(75) Inventors: Martin Raak, Köln (DE); Gerhard Baus, Windhagen (DE); Frank Blase, Bergisch Gladbach (DE)

(73) Assignee: Igus Spritzgussteile für die Industrie GmbH, Köln (DE)

( * ) Notice: Subject to any disclaimer, the term of this patent is extended or adjusted under 35 U.S.C. 154(b) by 0 days.

(21) Appl. No.: 10/127,952

(22) Filed: Apr. 23, 2002

(65) Prior Publication Data

US 2002/0181999 A1 Dec. 5, 2002

(30) Foreign Application Priority Data

Apr. 23, 2001 (DE) .................................. 201 07 002 U

(51) Int. Cl.⁷ .............................................. F16C 11/00
(52) U.S. Cl. .................... 403/135; 403/133; 403/140
(58) Field of Search ............................... 403/135–137, 403/141–143, 122, 133, 140; 384/203

(56) References Cited

U.S. PATENT DOCUMENTS

| | | | |
|---|---|---|---|
| 3,656,821 A | | 4/1972 | McCloskey et al. |
| 4,318,627 A | * | 3/1982 | Morin .................... 403/133 |
| 4,511,277 A | * | 4/1985 | McCabe .................. 403/140 |
| 4,591,276 A | * | 5/1986 | Schneider et al. ....... 384/206 |
| 4,993,863 A | * | 2/1991 | Inoue ..................... 403/133 |
| 5,409,320 A | * | 4/1995 | Maury et al. ............ 403/77 |
| 5,601,378 A | * | 2/1997 | Fukukawa et al. ....... 403/140 |
| 5,782,573 A | * | 7/1998 | Dorr et al. .............. 403/135 |
| 6,164,829 A | | 12/2000 | Wenzel et al. |
| 6,488,436 B1 | * | 12/2002 | Modat ..................... 403/135 |

FOREIGN PATENT DOCUMENTS

| | | |
|---|---|---|
| DE | 29804345 U1 | 6/1998 |
| DE | 198 13 721 A1 | 10/1999 |
| DE | 198 23 781 A1 | 12/1999 |
| DE | 20107002 U1 | 9/2001 |
| EP | 0 999 372 A1 | 5/2000 |
| FR | 1296963 A | 12/1961 |
| GB | 2160582 A | 12/1985 |

* cited by examiner

Primary Examiner—William L. Miller
(74) Attorney, Agent, or Firm—Akin Gump Strauss Hauer & Feld, LLP

(57) ABSTRACT

An angle joint for connecting two components in articulated fashion includes a joint ball, a cup at least partially surrounding the joint ball, and a liner positioned in the cup. The joint ball has a first mounting element for mounting the joint ball on a first component, while the cup has a second mounting element for mounting the cup to a second component. The second mounting element is rotatable about a preferred axis at least through an angular range, and is pivotal relative to the second mounting element. The liner has a nest with a nest opening for receiving the joint ball, at least one sliding surface for slidable mounting of the joint ball, first integrally molded form-fit elements for securing the liner in the cup, and second integrally molded form-fit elements for securing the joint ball inside the liner.

20 Claims, 3 Drawing Sheets

ANGLE JOINT

BACKGROUND OF THE INVENTION

The invention relates to an angle joint for the articulated connection of two components, with a joint ball, on which a first mounting element is provided for mounting the joint ball on a first component, and a ball cup, which at least partially surrounds the joint ball and is provided with a second mounting element for mounting a second component, where the first mounting element attached to the joint ball can rotate in a preferred direction, at least through an angular range, and pivot relative to the second mounting element.

The first and second mounting elements of generic angle joints are usually designed as stem-like projections, which can be in the form of threaded stems or rivets, without being restricted to this.

In generic angle joints, such as those described in DIN 71802, the joint ball is held in the cup by a separate spring washer, which is inserted in a circumferential groove in the cup. However, the spring washer is relatively awkward to handle, because it has to be inserted when the joint ball and its associated mounting element are already in the cup. Accordingly, only a little space is available to insert the spring washer.

Furthermore, it is a known feature to provide a bracket-shaped closing element on a cup equipped with a slot, so that the joint ball can be removed from the cup when the bracket is opened. However, a certain amount of space is required to be able to pivot the bracket and, furthermore, there is a risk of damaging the outwardly protruding bracket to the point where the joint ball can no longer be secured firmly in the cup.

In both of the above configurations, the joint ball must be pressed into the cup in order to be secured, thus creating a risk of irreversible deformation of the cup in the region of the joint ball.

BRIEF SUMMARY OF THE INVENTION

An object of the invention is to provide an angle joint, in which the joint ball can be easily and securely mounted in the cup and which is simple to manufacture.

According to the invention, an angle joint for connecting two components in articulated fashion includes a joint ball, a cup at least partially surrounding the joint ball, and a liner positioned in the cup. The joint ball has a first mounting element for mounting the joint ball on a first component, while the cup has a second mounting element for mounting the cup to a second component. The second mounting element is rotatable about a preferred axis at least through an angular range, and is pivotal relative to the second mounting element. The liner has a nest with a nest opening for receiving the joint ball, at least one sliding surface for slidable mounting of the joint ball, first integrally molded form-fit elements for securing the liner in the cup, and second integrally molded form-fit elements for securing the joint ball inside the liner.

With the provision of form-fit elements integrally molded on the liner, additional mounting elements, such as spring washers, locking brackets and the like, can be dispensed with to thereby greatly facilitate assembly of the angle joint. Furthermore, the separate liner makes it possible to attach the joint ball to it with little force and without the risk of damage. The sliding surface for the joint ball can also be adapted to the respective requirements, where the liner can be made of a plastic material. In particular, the liner can be made of an abrasion-resistant, compression-resistant, self-lubricating material so that the angle joint is particularly durable and maintenance-free, and so that the material pair comprising the joint ball and the liner has a low coefficient of friction.

The form-fit elements for securing the liner inside the cup, and/or the form-fit elements for securing the joint ball inside the liner, are preferably configured as snap elements.

To assemble the angle joint, the joint ball can first be snapped into the liner, and the liner then snapped into the cup.

The form-fit elements, particularly if they are snap elements, are preferably arranged such that they are self-locking in reference to the direction of the preferred axis of the first mounting element for mounting the first component on the joint ball, which is configured as a stem-like projection, for example. Self-locking in this sense means that the joint ball can only be removed from the cup by destroying the liner and/or the cup.

The liner is preferably configured as a cap-like part, which at least accommodates the joint ball almost entirely and the outside surface of which is in full contact with the inside wall of the cup. An area of the joint ball surrounding the mounting element can also lie outside the liner. At least somewhat more than half the joint ball is accommodated by the liner, such that the joint ball engages an undercut of the liner. If necessary, only a partial area of the outside of the liner can be in contact with the inside of the cup.

All or nearly all of the inside surface of the liner can be configured as a sliding surface that can come into contact with the corresponding sliding surface of the joint ball when the latter moves. The inside wall of the liner can also have several separate sliding surfaces.

The liner preferably has a circumferential edge, which delimits the nest for the joint ball towards the nest opening through which the joint ball is inserted into the liner, where the circumferential edge has at least one slit extending from the free end rim facing the nest opening over part of the height of the liner. Incorporating the slit increases the elastic deformability of the liner, so that the liner can be snapped onto the joint ball more easily. Preferably, numerous slits are provided over the circumference of the edge, thus forming elastically deformable flexible tabs between adjacent slits that serve as snap elements for securing the joint ball. The liner can be provided with two or more slits that can be distributed evenly around the circumference of the liner.

Preferably one of the slits, particularly preferably all of the slits, extend vertically from the end rim of the liner to the center point of the joint ball arranged in the liner, or beyond the center point of the joint ball, or up to or beyond the center of the joint ball nest.

This facilitates assembly of the joint ball. Furthermore, the areas of the liner laterally adjacent to the slits can be elastically deformed when the liner is mounted in the cup, so that the liner can be snapped into the cup more easily. To this end, the areas of the liner laterally adjacent to the slits, which can be configured as flexible tabs, can be deformed radially inwards, for example, thereby causing corresponding snap elements on the liner and the cup to engage.

The inside wall of the liner facing the joint ball can be provided with an inwardly protruding projection, which extends over at least part of the circumference of the joint ball and rests without play on the half of the joint ball facing the nest opening for the joint ball. The projection preferably rests against the joint ball in linear fashion. Several projections resting against the joint ball can be provided, with a total contact surface on the joint ball extending over the circumference of a circle, which is interrupted only by the slits incorporated in the liner. In this way, the joint ball can be mounted in the liner in a particularly secure fashion.

The projection protruding inwards from the inside wall of the liner can be at a distance from the free end rim of the circumferential edge of the liner that faces the nest opening for insertion of the joint ball in the liner. The nest opening for the joint ball preferably expands from the projection protruding inwards from the inside wall of the liner towards the nest opening, so that the edge of the liner adjacent to the nest opening can be compressed in the direction of the joint ball. The previously described slots in the liner facilitate compression. This facilitates the snap connection of snap elements arranged on the outside of the elastically deformable liner with corresponding snap elements provided on the essentially dimensionally stable cup.

In order to snap the liner into the cup, the liner can be provided with a radially protruding projection that runs around part, or preferably all, of the circumference and engages a corresponding groove or recess in the cup. The outwardly protruding projection on the liner is preferably adjacent, or immediately adjacent, to the end rim of the liner that delimits the nest opening of the joint ball.

Regardless of the arrangement of the form-fit elements for securing the liner inside the cup, or for securing the joint ball inside the liner, the respective form-fit elements can be axially spaced apart in reference to the direction of insertion of the joint ball into the liner, or relative to the longitudinal axis of the liner. The form-fit elements for securing the liner to the cup preferably display a smaller axial distance from the nest opening for the joint ball than the form-fit elements for securing the joint ball in the liner.

The liner can be of rotatable design in reference to rotation about the longitudinal axis of the liner, which is perpendicular to the nest opening for the joint ball. For this purpose, the liner can be pretensioned against the inside of the cup, or virtually freely rotatable. The frictional resistance between the liner and the cup, which resists rotational movement of the liner about its longitudinal axis, can be greater than, less than or essentially equal to the frictional resistance between the joint ball and the liner.

To facilitate disassembly of the liner, the cup can be provided with at least one slit that extends from the free end rim delimiting the nest opening for the liner in the longitudinal direction of the cup. In particular, the slit can be of smaller longitudinal dimensions than the slits in the liner, which extend from the free end rim over part of the height of the liner. The snap elements for securing the liner to the cup, as well as the length of the slit in the cup, can be dimensioned such that the joint ball can be removed from the cup in that the mounting element on the joint ball is pivoted towards the mounting element on the cup and pressed by means of manual force. As a result, the joint ball can be disassembled without any additional tools, where the joint ball can simultaneously absorb very high tension forces perpendicular to the nest opening of the liner for the joint ball.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 3b is an enlarged sectional view of a portion of the cup of FIG. 3a; and

DETAILED DESCRIPTION OF THE INVENTION

Figure 1:
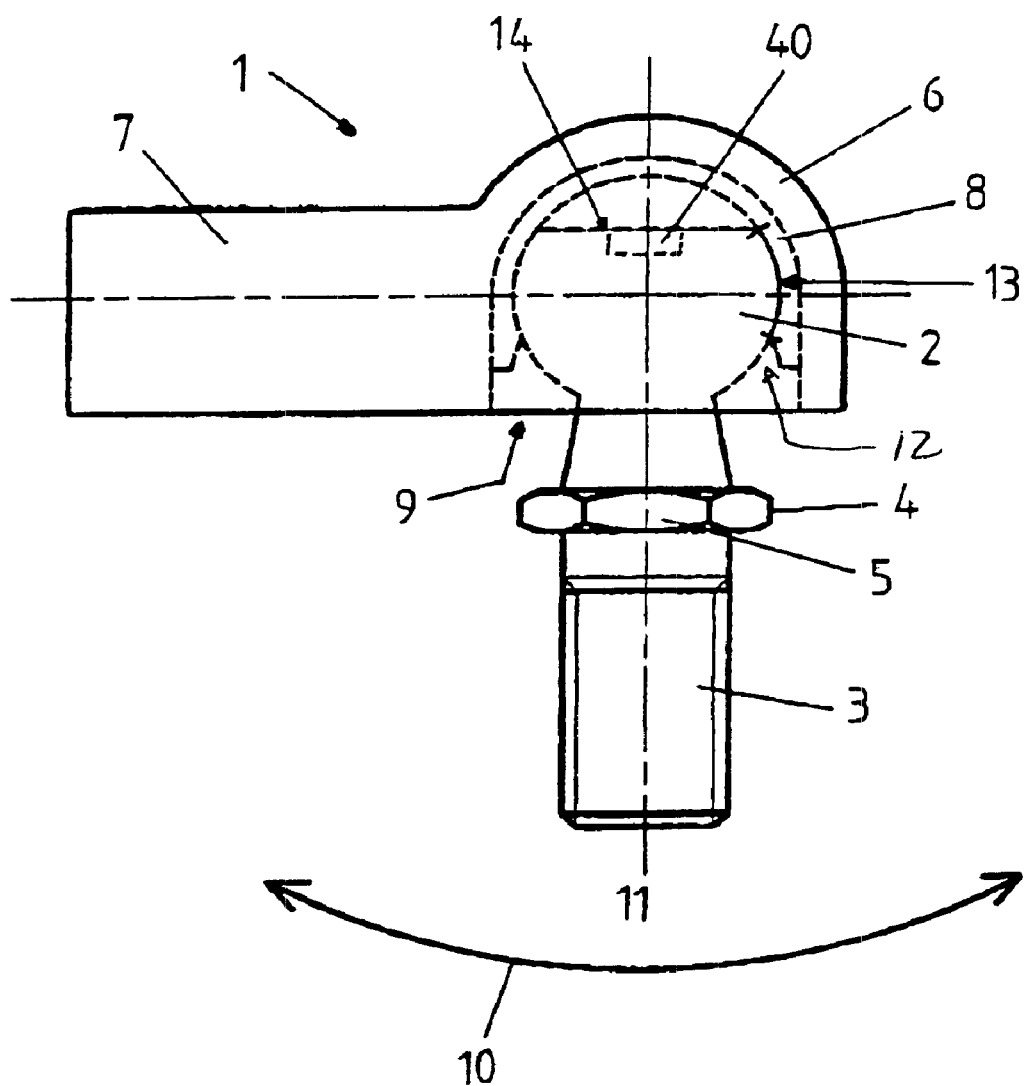
FIG. 1 is a schematic side view of an angle joint according to the invention.

Referring now to the drawings, and to FIG. 1 in particular, an angle joint 1 according to the invention has a joint ball 2 with a stem-like mounting element 3 attached thereto, preferably integrally molded therewith, to mount the joint ball on a first component. The stem-like mounting element 3 is preferably in the form of a threaded stem, which includes working surfaces 5 with radially projecting edges 4 for receiving a tool, such as a spanner wrench, for attaching the joint ball to the respective component. A cup 6, which completely surrounds joint ball 2, also has an integrally molded mounting element 7 in the form of a stem-like projection with a female screw thread, to which a second component can be attached. It will be understood that joint ball 2 can also protrude partially from the cup.

According to the invention, a liner 8 is provided, and which is arranged entirely inside the cup 6 in the preferred embodiment and which surrounds the outside of the joint ball 2, where the joint ball 2 protrudes partially from the liner 8 towards a nest opening 9, through which the liner 8 can be inserted into the cup 6.

As indicated by arrow 10, the mounting element 3 can pivot relative to the mounting element 7 and also about a longitudinal axis 11 of the mounting element, which is parallel to the nest opening 9 of the cup 6 and to a nest opening 12 of liner 8, through which the joint ball 2 can be inserted into the latter.

An outside surface 22 (FIG. 2b) of the liner 8 is in full contact with an inside wall 34 (FIG. 3a) of the cup 6. In addition, a spherical cap 13 of the joint ball 2 is in full contact with the inside of the liner 8. In this context, the joint ball 2 is cut off by a plane surface 14, which is perpendicular to the longitudinal axis 11 of the mounting element 3. A recess 40, e.g. a hexagon socket, can be integrally molded in plane 14 in order to accommodate a tool with which the mounting element can be screwed into the associated component.

Figure 2A:
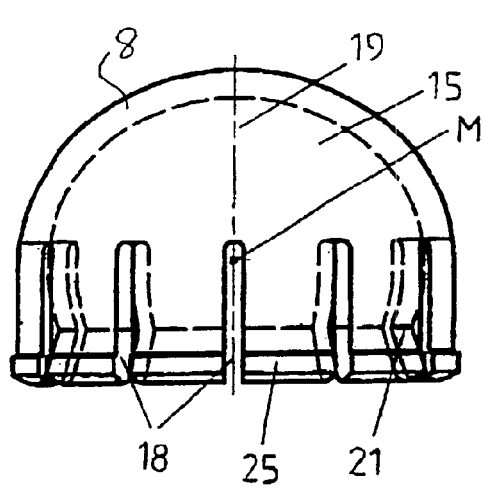
FIG. 2a is a side elevational view of a liner that forms part of the angle joint of FIG. 1.
Figure 2B:
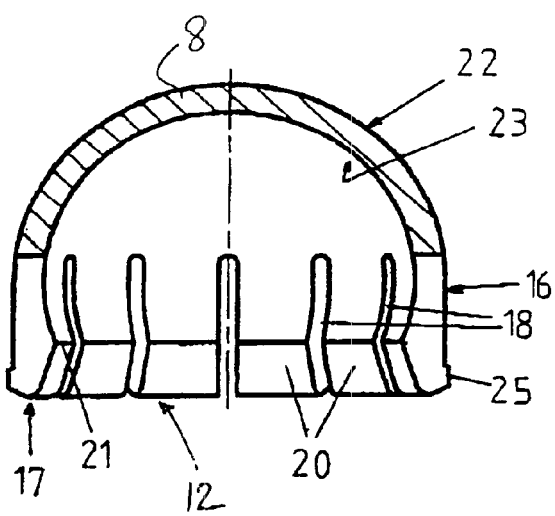
FIG. 2b is a sectional view of the liner.
Figure 2C:
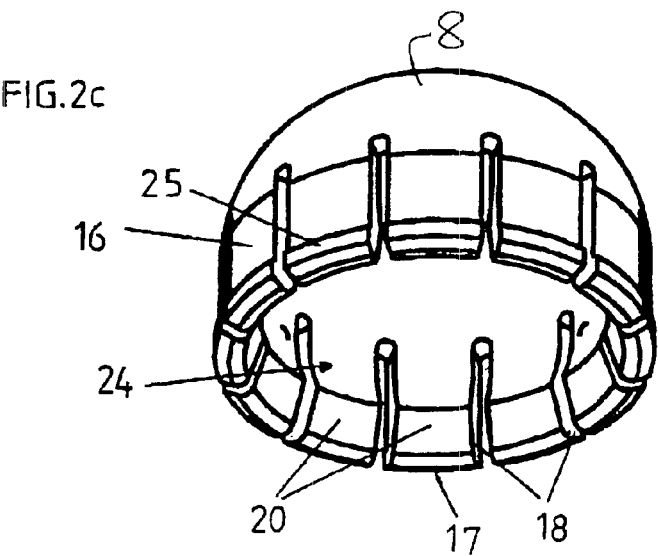
FIG. 2c is a perspective view of the liner.
Figure 3A:
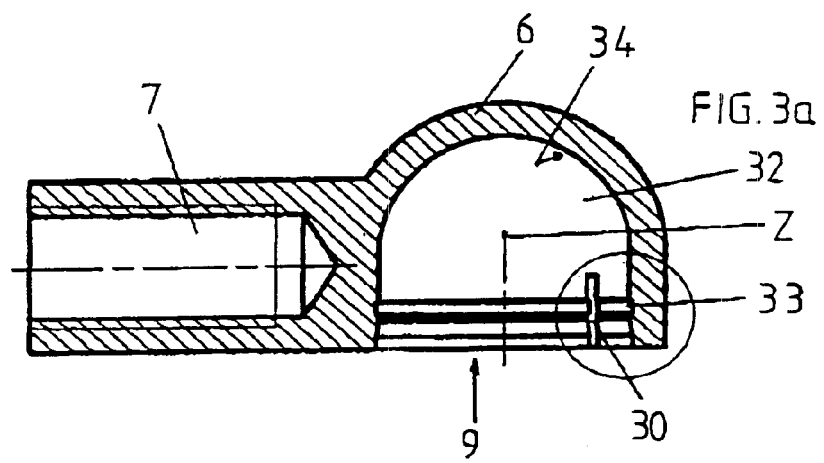
FIG. 3a is a sectional view of a cup that forms part of the angle joint of FIG. 1.

The liner 8, which is shown in greater detail in FIGS. 2a–2c, is of cap-like construction and has a nest 15 in the form of a spherical cap for receiving the joint ball 2, on which a generally cylindrical edge 16 with an end rim 17 is integrally molded. The end rim 17 delimits the outside of nest opening 12. The edge 16 has integrally molded slits 18, which terminate at the end rim 17 and extend parallel to the longitudinal axis 19 of the liner 8 over a portion of its height. The slits 18 are distributed uniformly around the circumference of the liner, thus resulting in elastically deformable flexible tabs 20. The slits 18 extend from end rim 17 beyond a center point M of spherical cap-shaped nest 15, or beyond the congruent center point of joint ball 2 located in nest 15.

For the form-fit mounting of the joint ball 2, the insides of flexible tabs 20 have integrally molded projections 21, which protrude into the interior of the liner 8, rest against the joint ball 2 in linear fashion and together form a circle, apart from the interruptions caused by the slits 18. The height of the projections 21 decreases towards the nest opening 12, such that the cross-section of liner 8 expands from projections 21 towards nest opening 12.

For the snap mounting of liner 8, an axially protruding circumferential edge 25 is provided next to the end rim 17 on the outside of the liner 8, which is only interrupted by the slits 18 and which is accommodated by a corresponding groove 33 (FIG. 3*a*) of the cup 6. As a result, the liner 8 can rotate about its axis 19 in the cup 6.

In order to assemble the angle joint 1, the joint ball 2 is first pressed into the liner 8 in the axial direction, causing the flexible tabs 20 to be bent outwardly, and thus snapped into place. Subsequently, the liner 8 with the joint ball 2 is inserted into the cup 6 in the axial direction and likewise snapped into place. In this context, the axial distance between the projections 21 and the snap edge 25 enables deformation of the flexible tabs 20 towards the nest opening 19, this being promoted by the decreasing height of projections 21 towards the nest opening 12. If, after the liner 8 is mounted in the cup 6, a tension force is exerted on the mounting element 3 parallel to the axis 11, the snap elements become self-locking, because the joint ball 2 presses against the spherical cap-shaped edge of the projections 21 and thus securely fixes the edge 25 in the groove 33 of the cup 6. At this point, the joint ball 2 can only be disassembled by sufficiently high tension forces to destroy the cup 6 or the mounting element 3.

Figure 3B:
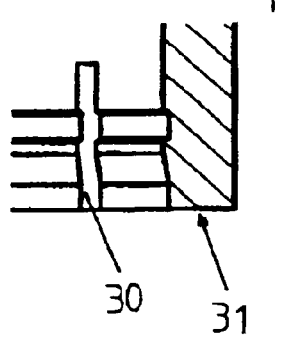
Figure 4:
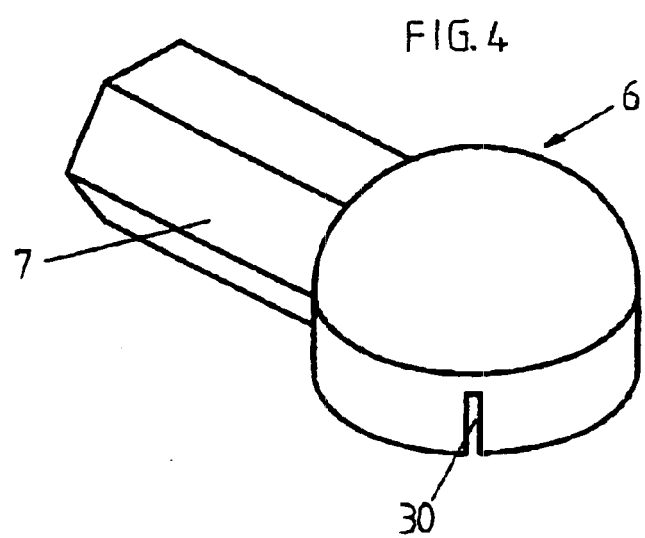
FIG. 4 is a perspective view of the cup.

For non-destructive disassembly of the joint ball 2, the cup 6 is provided with a slit 30 (FIGS. 3*a*, 3*b* and 4), which extends from an end rim 31 of the cup 6 that delimits the nest opening 9, over a portion of the cup height. Another identical slit 30 is integrally molded on the opposite side of the cup, where only one, or also several slits 30 can be provided if necessary. The slit 30 extends from the end rim 31 to a position below a center Z of nest 32 of the cup for the liner 8.

In order to disassemble joint ball 2, the stem-like mounting element 3 can be manually pressed towards the mounting element 7 of the cup 6, so that the areas of the cup 6 adjacent to the slits 30 are pressed outwards to thereby release the joint ball 2 from the liner 8.

In this context, the liner 8 can be removed either together with or after removal of the joint ball 2.

The joint ball 2 and the mounting element 3, which can be integrally molded on the joint ball 2, as well as the cup 6, can be made of a plastic material.

It will be appreciated by those skilled in the art that changes could be made to the embodiments described above without departing from the broad inventive concept thereof. It is uderstood, therfore, that this invention is not limited to the particular embodiments disclosed, but it is intended to cover modifications within the spirit and scope of the present invention as defined by the appended claims.

We claim:

1. An angle joint for connecting two components in articulated fashion, the angle joint comprising:
   a joint ball having a first mounting element for mounting the joint ball on a first component;
   a cup at least partially surrounding the joint ball, the cup having a second mounting element for mounting the cup to a second component, the second mounting element being rotatable about a preferred axis at least through an angular range, and pivotal relative to the second mounting element; and
   a liner positioned in the cup, the liner having:
      a nest with a nest opening for receiving the joint ball;
      at least one sliding surface for slidable mounting of the joint ball;
      first integrally molded form-fit elements for securing the liner in the cup; and
      second integrally molded form-fit elements for securing the joint ball inside the liner, wherein
      the first and second form-fit elements are first and second snap elements, respectively; and
      the liner further comprises a lateral edge with a first end rim which delimits the nest and a plurality of slits positioned around a circumference of the liner, the slits extending in a longitudinal direction from the first end rim to a position that is less than a height of the liner to form flexible tabs which include the first and second snap elements, the first and second snap elements being arranged on radially outer and radially inner sides of the same flexible tabs.

2. The angle joint of claim 1, wherein the liner is cap-shaped to almost entirely accommodate the joint ball, the liner having an outside surface which is in full contact with an inside wall of the cup.

3. The angle joint of claim 1, wherein the slits extend vertically from the first end rim of the liner up to or beyond a center point of the joint ball.

4. The angle joint of claim 1, wherein the second snap elements comprise at least one inwardly protruding projection on an inside wall of the liner, the at least one inwardly protruding projection extending over at least part of a circumference of the joint ball, the at least one inwardly protruding projection resting without play on a half of the joint ball that faces the nest opening.

5. The angle joint of claim 4, wherein the nest expands from the at least one inwardly protruding projection towards the nest opening.

6. The angle joint of claim 1, wherein the first snap elements comprise a radially protruding projection on an outside surface of the liner, the radially protruding projection extending around at least part of the circumference of the liner, and further wherein a corresponding groove is provided in the cup for interacting with the radially protruding projection to form a snap connection between the radially protruding projection and the groove.

7. The angle joint of claim 1, wherein the liner is arranged in the cup to rotate about a longitudinal axis of the liner.

8. The angle joint of claim 1, wherein the cup comprises a cup opening, a second end rim delimiting the cup opening, and at least one cup slit that extends from the second end rim to a position that is less than a height of the cup.

9. The angle joint of claim 1, wherein the joint element is disassembled by applying manual force to the first mounting element in the direction of the second mounting element.

10. The angle joint of claim 1, further comprising a recess integrally molded in the joint ball for insertion of a tool.

11. The angle joint of claim 1, wherein at least one of the joint ball, the liner and the cup is made of a plastic material.

12. The angle joint of claim 1, wherein the first snap elements comprise first snap projections, and the second snap elements comprise second snap projections, the first and second projections being arranged such that, when tension force is exerted on the first mounting element parallel to an axis of the first mounting element, the second snap projections firmly secure the first snap projections in a recess in the cup.

13. The angle joint of claim 1, wherein the first snap elements have a smaller axial distance from the nest opening than the second snap elements.

14. The angle joint of claim 1, wherein the liner is in full contact with an inside wall of the cup.

15. The angle joint of claim 1 wherein the second snap elements enable the joint ball to be snapped into the liner while the liner is disassembled from the cup.

16. An angle joint for connecting two components in articulated fashion, the angle joint comprising:
   a joint ball having a first mounting element for mounting the joint ball on a first component;
   a cup at least partially surrounding the joint ball, the cup having a second mounting element for mounting the cup to a second component, the second mounting element being rotatable about a preferred axis at least through an angular range, and pivotal relative to the second mounting element; and
   a liner positioned in the cup, the liner having:
      a nest with a nest opening for receiving the joint ball;
      at least one sliding surface for slidable mounting of the joint ball;
      first integrally molded form-fit elements for securing the liner in the cup; and
      second integrally molded form-fit elements for securing the joint ball inside the liner, wherein
         the first and second form-fit elements are first and second snap elements, respectively, the second snap elements enabling the joint ball to be snapped into the liner while the liner is disassembled from the cup;
         the first snap elements have a smaller axial distance from the nest opening than the second snap elements; and
         the liner further comprises a lateral edge with a first end rim which delimits the nest and a plurality of slits positioned around a circumference of the liner, the slits extending in a longitudinal direction from the first end rim to a position that is less than a height of the liner to form flexible tabs which include the first and second snap elements, the first and second snap elements being arranged on radially outer and radially inner sides of the same flexible tabs, each tab being provided with at least a first snap element and a second snap element.

17. An angle joint for connecting two components in articulated fashion, the angle joint comprising:
   a joint ball having a first mounting element for mounting the joint ball on a first component;
   a cup at least partially surrounding the joint ball, the cup having a second mounting element for mounting the cup to a second component, the second mounting element being rotatable about a preferred axis at least through an angular range, and pivotal relative to the second mounting element; and
   a liner positioned in the cup, the liner having:
      a nest with a nest opening for receiving the joint ball;
      at least one sliding surface for slidable mounting of the joint ball;
      first integrally molded form-fit elements for securing the liner in the cup; and
      second integrally molded form-fit elements for securing the joint ball inside the liner, wherein
         the first and second form-fit elements are first and second snap elements, respectively, the second snap elements enabling the joint ball to be snapped into the liner while the liner is disassembled from the cup;
         the first snap elements have a smaller axial distance from the nest opening than the second snap elements;
         the liner further comprises a lateral edge with a first end rim which delimits the nest and a plurality of slits positioned around a circumference of the liner, the slits extending in a longitudinal direction from the first end rim to a position that is less than a height of the liner to form flexible tabs which include the first and second snap elements, the first and second snap elements being arranged on radially outer and radially inner sides of the same flexible tabs, each tab being provided with at least a first snap element and a second snap element; and
      the cup includes a recess being arranged with an entire height of the recess spaced apart from a projection of the second snap element resting at the joint ball, the recess being arranged more closely to the nest opening than the second snap element.

18. An angle joint for connecting two components in articulated fashion, the angle joint comprising:
   a joint ball having a first mounting element for mounting the joint ball on a first component;
   a cup at least partially surrounding the joint ball, the cup having a second mounting element for mounting the cup to a second component, the second mounting element being rotatable about a preferred axis at least through an angular range, and pivotal relative to the second mounting element; and
   a liner positioned in the cup, the liner having:
      a nest with a nest opening for receiving the joint ball;
      at least one sliding surface for slidable mounting of the joint ball;
      first integrally molded form-fit elements for securing the liner in the cup; and
      second integrally molded form-fit elements for securing the joint ball inside the liner, wherein
         the first and second form-fit elements are first and second snap elements, respectively, the second snap elements enabling the joint ball to be snapped into the liner while the liner is disassembled from the cup;
         the first snap elements have a smaller axial distance from the nest opening than the second snap elements;
         the cup comprises a cup opening, a cup end rim delimiting the cup opening, and at least one slit extending in a longitudinal direction from the cup end rim to a position that is less than a height of the cup; and
         the joint element is disassemblable by applying a manual force to the first mounting element in the direction of the second mounting element.

19. An angle joint for connecting two components in articulated fashion, the angle joint comprising:
   a joint ball having a first mounting element for mounting the joint ball on a first component;
   a cup at least partially surrounding the joint ball, the cup having a second mounting element for mounting the cup to a second component, the second mounting element being rotatable about a preferred axis at least through an angular range, and pivotal relative to the second mounting element; and a liner positioned in the cup, the liner having:
  a nest with a nest opening for receiving the joint ball;
  at least one sliding surface for slidable mounting of the joint ball;
  first integrally molded form-fit elements for securing the liner in the cup; and
  second integrally molded form-fit elements for securing the joint ball inside the liner, wherein
    the first and second form-fit elements are first and second snap elements, respectively, the second snap elements enabling the joint ball to be snapped into the liner while the liner is disassembled from the cup;
    the first snap elements have a smaller axial distance from the nest opening than the second snap elements;
    the liner further comprises a lateral edge with a first end rim which delimits the nest and a plurality of slits positioned around a circumference of the liner, the slits extending in a longitudinal direction from the first end rim to a position that is less than a height of the liner to form flexible tabs which include the first and second snap elements, the first and second snap elements being arranged on radially outer and radially inner sides of the same flexible tabs;
    the cup includes a recess being arranged with an entire height of the recess spaced apart from a projection of the second snap element resting at the joint ball, the recess being arranged more closely to the nest opening than the second snap element;
    the cup comprises a cup opening, a second end rim delimiting the cup opening, and at least one slit extending in a longitudinal direction from the second end rim to a position that is less than a height of the cup; and
    the joint element is disassemblable by applying a manual force to the first mounting element in the direction of the second mounting element.

20. An angle joint for connecting two components in articulated fashion, the angle joint comprising:
  a joint ball having a first mounting element for mounting the joint ball on a first component;
  a cup at least partially surrounding the joint ball, the cup having a second mounting element for mounting the cup to a second component, the second mounting element being rotatable about a preferred axis at least through an angular range, and pivotal relative to the second mounting element; and
  a liner positioned in the cup, the liner having:
    a nest with a nest opening for receiving the joint ball;
    at least one sliding surface for slidable mounting of the joint ball;
    first integrally molded form-fit elements for securing the liner in the cup; and
    second integrally molded form-fit elements for securing the joint ball inside the liner, wherein
      the first and second form-fit elements are first and second snap elements, respectively;
      the liner further comprises a lateral edge with a first end rim which delimits the nest and a plurality of slits positioned around a circumference of the liner, the slits extending in a longitudinal direction from the first end rim to a position that is less than a height of the liner to form flexible tabs which include the first and second snap elements, the first and second snap elements being arranged on radially outer and radially inner sides of the same flexible tabs; and
      end portions of the flexible tabs are arranged at the nest opening of the liner and are configured to be deformed radially inward by introducing the liner into the cup and securing the liner within the cup, thereby diminishing the nest opening.

* * * * *